C. N. WHITNEY.
POULTRY FEEDER.
APPLICATION FILED MAY 12, 1909.
963,968.
Patented July 12, 1910.
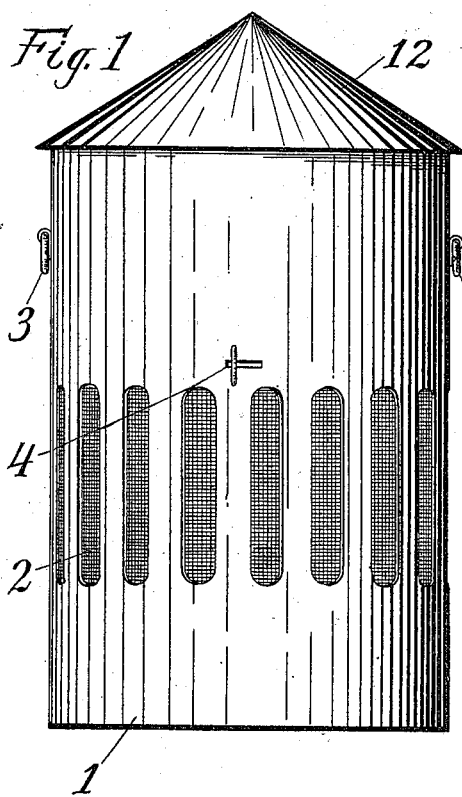
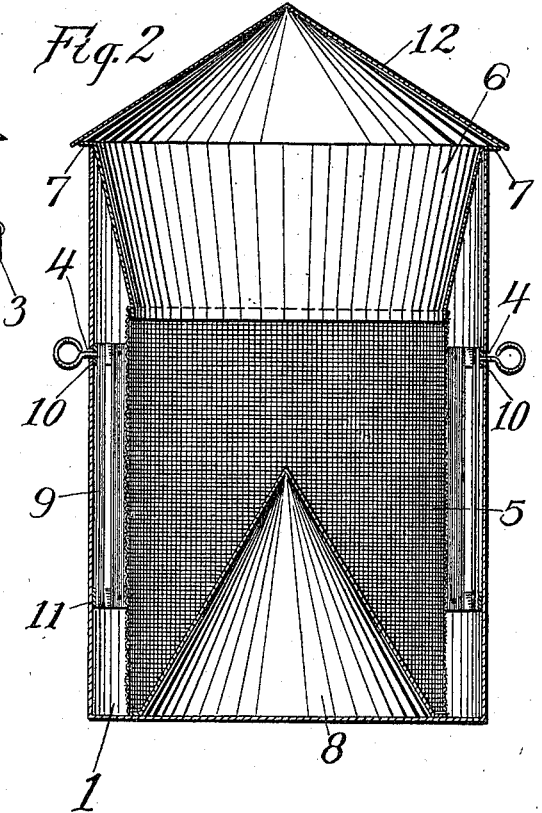
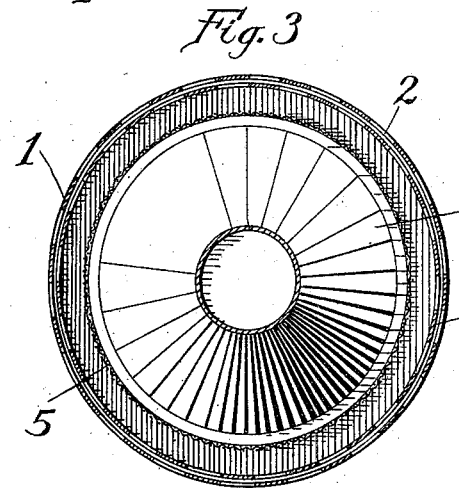
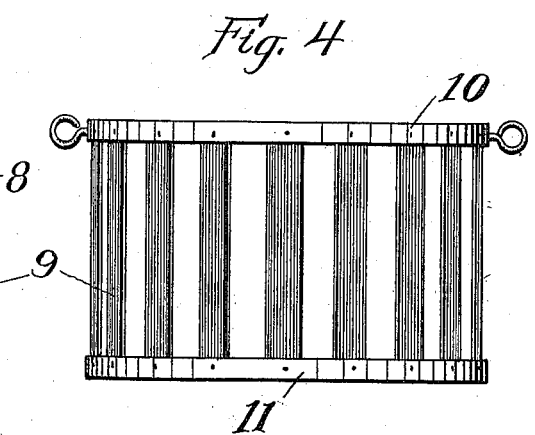
Witnesses
Charles N. Whitney, Inventor
By Milo B. Stevens & Co., Attorneys

UNITED STATES PATENT OFFICE.

CHARLES N. WHITNEY, OF ELLSWORTH, MAINE.

POULTRY-FEEDER.

963,968.  Specification of Letters Patent.  Patented July 12, 1910.

Application filed May 12, 1909. Serial No. 495,425.

*To all whom it may concern:*

Be it known that I, CHARLES N. WHITNEY, a citizen of the United States, residing at Ellsworth, in the county of Hancock and State of Maine, have invented certain new and useful Improvements in Poultry-Feeders, of which the following is a specification.

My invention relates to poultry feeders, and more particularly to a feeder the object of which is to promote cleanliness about the poultry yard, and economy in the feed.

In the accompanying drawing, which illustrates my invention, and forms a part of this specification, Figure 1 is an elevation of my improved feeder. Fig. 2 is a vertical sectional view therethrough. Fig. 3 is a horizontal sectional view therethrough, and, Fig. 4 is an elevation of the shutters removed.

In the embodiment of my invention as shown, I provide a cylindrical feed casing 1 which is open at its upper end and has a plurality of vertical slotted feed openings 2 spaced from one another entirely therearound. The casing 1 also has diametrically opposite handles 3, and diametrically opposite horizontal slots 4 in a plane above the upper ends of its feed openings 2.

Disposed centrally within the casing 1 is a cylindrical feed holding screen 5, which is of less diameter than said casing, and the wall of which is spaced from the wall of said casing equally therearound. The upper open end of the screen 5 receives the lower tapered portion of a funnel 6, having its upper edge provided with a flange 7 adapted to rest upon the upper edge of the casing 1. The lower open end of the screen 5 rests upon the base of the casing 1 around a central cone 8 tapering centrally and upwardly from said casing base and operating as a feed spreader to force the grain against screen 5 where the poultry can reach the same, through the openings 2 and the mesh of said screen.

Disposed within the casing 1, in the space between its wall and the screen 5, are a plurality of shutters 9, comprising vertical slats secured at their ends between upper and lower horizontal hoops 10 and 11 respectively, which hoop 10 has diametrically opposite outstanding looped arms extending outwardly through the horizontal slots 4 of the casing 1, and forming handles whereby to slide the said shutters, as a whole, either to positions between feed openings 2 or alined with said feed openings, to respectively open or close the same. A conical top 12, fitting over the open end of the casing 1, and having overhanging edges, completes the feed. From this it will be seen my feeder promotes cleanliness, economizes feed, and may be quickly and easily closed to keep out mice and other animals especially during the night time.

Having thus described my invention, I claim:

1. A poultry feeder comprising a feed casing provided with a plurality of feed openings, a feed holding screen of reduced proportions to said casing and loosely, removably disposed therein and providing a space between itself and said casing whereby to protect the grain falling from said screen, a feed diverting cone disposed upon said base and fitting the lower end of said screen, and a feed funnel disposed at the upper end of said casing and fitting the upper end of said screen, said cone and funnel being adapted to maintain said screen in position.

2. A poultry feeder comprising a cylindrical feed casing, having a plurality of feed openings in its wall and comprising an upper open end, a cylindrical feed holding screen of less diameter than said casing and disposed therein, a feed funnel having one end provided with a flange resting upon said casing end, and tapering downwardly into said screen, and a cover for said casing.

In testimony whereof I affix my signature, in presence of two witnesses.

CHARLES N. WHITNEY.

Witnesses:
   LOUIS F. HIGGINS,
   LEON R. MOOR.